United States Patent
Morofuji et al.

(10) Patent No.: US 10,359,881 B2
(45) Date of Patent: Jul. 23, 2019

(54) CONTROL DEVICE, INPUT SYSTEM, AND CONTROL METHOD

(71) Applicant: DENSO TEN LIMITED, Kobe-shi, Hyogo (JP)

(72) Inventors: Hironobu Morofuji, Kobe (JP); Tatsuya Yamaguchi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 15/842,390

(22) Filed: Dec. 14, 2017

(65) Prior Publication Data
US 2018/0224998 A1    Aug. 9, 2018

(30) Foreign Application Priority Data

Feb. 6, 2017 (JP) .................................. 2017-019838

(51) Int. Cl.
*G06F 3/041* (2006.01)
*G06F 3/045* (2006.01)
*G06F 3/01* (2006.01)

(52) U.S. Cl.
CPC ............ *G06F 3/0416* (2013.01); *G06F 3/016* (2013.01); *G06F 3/0412* (2013.01)

(58) Field of Classification Search
CPC ......... G06F 3/016; G06F 3/0416; G06F 3/041
See application file for complete search history.

(56) References Cited

U.S. PATENT DOCUMENTS

| | | | | |
|---|---|---|---|---|
| 2011/0148774 | A1* | 6/2011 | Pihlaja | G06F 3/04883 345/173 |
| 2013/0265268 | A1* | 10/2013 | Okumura | G06F 3/0488 345/173 |
| 2013/0285910 | A1* | 10/2013 | Adachi | G06F 3/016 345/159 |
| 2017/0060240 | A1* | 3/2017 | Iino | G06F 3/016 |

FOREIGN PATENT DOCUMENTS

| | | |
|---|---|---|
| JP | 2013-109429 A | 6/2013 |
| JP | 2016-170766 A | 9/2016 |

* cited by examiner

*Primary Examiner* — Nan-Ying Yang
(74) *Attorney, Agent, or Firm* — Oliff PLC (57) ABSTRACT

There is provided a control device. An operation detecting unit configured to detect an operation of a user on an operation surface of a panel. A drive unit configured to drive a vibrating element attached to the panel, thereby vibrating the panel. If the operation detecting unit detects the operation, the drive unit drives the vibrating element while switching between a first vibration mode and a second mode different in at least some vibration frequencies, thereby sequentially giving different types of vibration different in at least some frequencies to the panel.

8 Claims, 7 Drawing Sheets

CONTROL DEVICE, INPUT SYSTEM, AND CONTROL METHOD

CROSS-REFERENCE TO RELATED APPLICATION

This application is based on and claims priority under 35 USC 119 from Japanese Patent Application No. 2017-019838 filed on Feb. 6, 2017.

TECHNICAL FIELD

The present invention relates to a control device, an input system, and a control method.

In the related art, an input system for giving a feeling to a user such that the user can recognize that the input system has received a user's operation on the operation surface of a panel is known. For such an input system, a technology for generating a click by vibrating a vibrating element with voltage having a waveform obtained by applying an envelope to a sine wave if the operation surface of a panel is operated has been proposed (see Patent Document 1 for instance).

[Patent Document 1] Japanese Patent Application Laid-Open No. 2013-109429

The input system of the related art is a system for giving an operational feeling to a user by vibration at a single frequency. However, the input system does not always give a sufficient operational feeling to the user. Therefore, there is a room for improvement in improving the operational feeling to be given to a user.

SUMMARY

It is therefore an object of the present invention is to provide a control device, an input system, and a control method capable of improving an operational feeling to be given to a user.

A control device according to an aspect of the present invention includes an operation detecting unit and a drive unit. The operation detecting unit detects an operation of a user on an operation surface of a panel. The drive unit drives a vibrating element attached to the panel, thereby vibrating the panel. If the operation detecting unit detects the operation, the drive unit drives the vibrating element while switching between a first vibration mode and a second mode different in at least some vibration frequencies, thereby sequentially giving different types of vibration different in at least some frequencies to the panel.

According to the aspect of the present invention, it is possible to provide a control device, an input system, and a control method capable of improving an operational feeling to be given to a user.

BRIEF DESCRIPTION OF THE DRAWINGS

Exemplary embodiments of the present invention will be described in detail based on the following figures, wherein.

DETAILED DESCRIPTION

Hereinafter, embodiments of a control device, an input system, and a control method will be described with reference to the accompanying drawings. However, the present invention is not limited to the following embodiments.

<1. Control Process of Input System>

Figure 1:
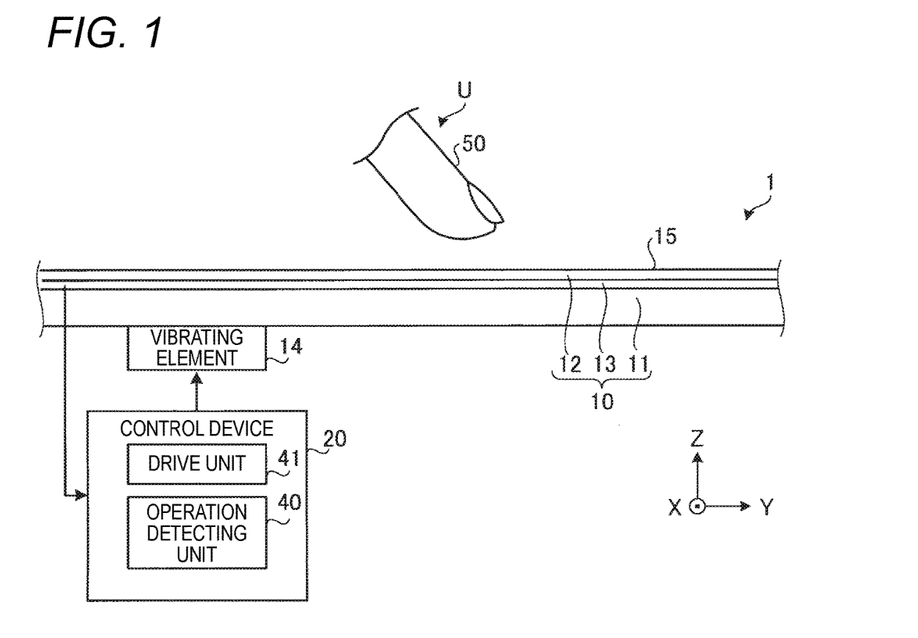
FIG. 1 is a view illustrating an example of the configuration of an input system according to an embodiment.

FIG. 1 is a view illustrating an example of the configuration of an input system 1 according to an embodiment. As shown in FIG. 1, the input system 1 according to the embodiment includes a panel 10, vibrating elements 14, and a control device 20.

The panel 10 includes a supporting plate 11, a protective layer 12, and a touch sensor 13, and the touch sensor 13 and the protective layer 12 are sequentially stacked on the supporting plate 11. The protective layer 12 is made of, for example, glass or a resin film, and the front surface of the protective layer 12 is an operation surface 15 of the panel 10.

The touch sensor 13 is a sensor capable of detecting the positions of touches of a user U on the operation surface 15 of the panel 10 (hereinafter, also referred to as user's touch positions), and is, for example, an electrostatic capacitance type touch panel; however, it may be a pressure-sensitive resistance type touch sensor. The vibrating elements 14 are attached to the front surface or rear surface of the panel 10, and vibrate according to drive voltages output from the control device 20.

The control device 20 drives the vibrating elements 14 in response to operations of the user U on the operation surface 15 of the panel 10 (hereinafter, also referred to as user's operations), thereby vibrating such that the panel 10. The control device 20 includes an operation detecting unit 40 and a drive unit 41.

The operation detecting unit 40 detects user's operations on the basis of user's touch positions detected by the touch sensor 13. If the operation detecting unit 40 detects user's operations, the drive unit 41 drives the vibrating elements 14 on the basis of the detection results, thereby vibrating the panel 10.

For example, if the operation detecting unit 40 detects user's operations, the drive unit 41 applies a drive voltage for a first vibration mode and a drive voltage for a second vibration mode different in at least some vibration frequencies to the vibrating elements 14 while switching between the drive voltages, thereby sequentially giving different types of vibration different in at the at least some frequencies to the panel 10.

As a result, it is possible to give a plurality of different feelings to the user U by different types of vibration, and it is possible to improve the operational feeling to be given to the user U. Hereinafter, operations which the user U performs with a finger 50 will be described as user's operations; however, the user may perform user's operations with a stylus pen or the like.

Figure 2:
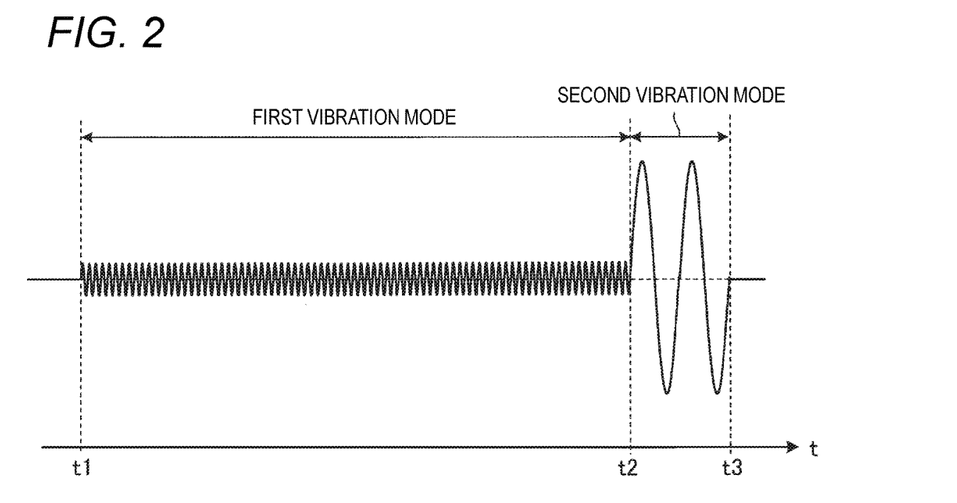
FIG. 2 is a view illustrating an example of vibration of a panel which can be given by a control device by a control device according to the embodiment.

FIG. 2 is a view illustrating an example of vibration of the panel 10 which can be given by the control device 20. As shown in FIG. 2, if the operation detecting unit 40 detects a slide operation of the user U, the drive unit 41 drives the vibrating elements 14 in the first vibration mode, thereby giving a first type of vibration to the panel 10, for a predetermined time (from a time point t1 to a time point t2). Here, the slide operation is an operation of moving the finger on the operation surface 15 of the panel 10.

The first type of vibration is, for example, vibration at a frequency in an ultrasonic frequency band (a frequency band of about 20 kHz or higher). The first type of vibration reduces the frictional force of the operation input unit 52 acting on the finger 50 of the user U. Therefore, it is possible to give a slippery feeling to the user U performing the slide operation of moving the finger 50 on the operation surface 15. In this way, it is possible to make the user U feel as if the finger is sucked in the direction of the slide operation (hereinafter, referred to as a feeling of being sucked).

Thereafter, the drive unit 41 drives the vibrating elements 14 in the second vibration mode, thereby giving a second type of vibration at a frequency lower than that of the first type of vibration to the panel 10, for a time (from the time point t2 to a time point t3) shorter than that of the first type of vibration. The second type of vibration is produced, for example, at a frequency in a low-frequency band (for example, a frequency band of 300 Hz or lower), and can give a click feeling in response to the slide operation of the user U, i.e. the operation of moving the finger 50 on the operation surface 15, after the feeling of being sucked.

Therefore, for example, in the case where the user U performs a slide operation on a slide button displayed on a display device (not shown in FIG. 1), it is possible to give a feeling of being sucked and then give a click feeling. Therefore, it is possible to improve the operational feeling to be given to the user U.

However, since the first type of vibration and the second type of vibration need only to be different types of vibration different from each other in at least some frequencies, the frequencies of the first type of vibration and the second type of vibration are not limited to the above-mentioned examples. Also, although the slide operation has been taken as an example of a user's operation, other operations such as a pressing operation on the operation surface 15 may cause switching of vibration of the panel 10 between the first type of vibration and the second type of vibration.

As described above, if detecting a user's operation, the control device 20 according to the embodiment drives the vibrating elements 14 while switching between the first vibration mode and the second vibration mode different in at least some frequencies, thereby subsequently giving different types of vibration different in at least some frequencies to the panel 10. Therefore, it is possible to subsequently give different feelings to the user U operating the operation surface 15 of the panel 10 by different types of vibration. In this way, it is possible to improve the operational feeling to be given to the user U.

<2. Configuration of Electronic Device System>

Figure 3:
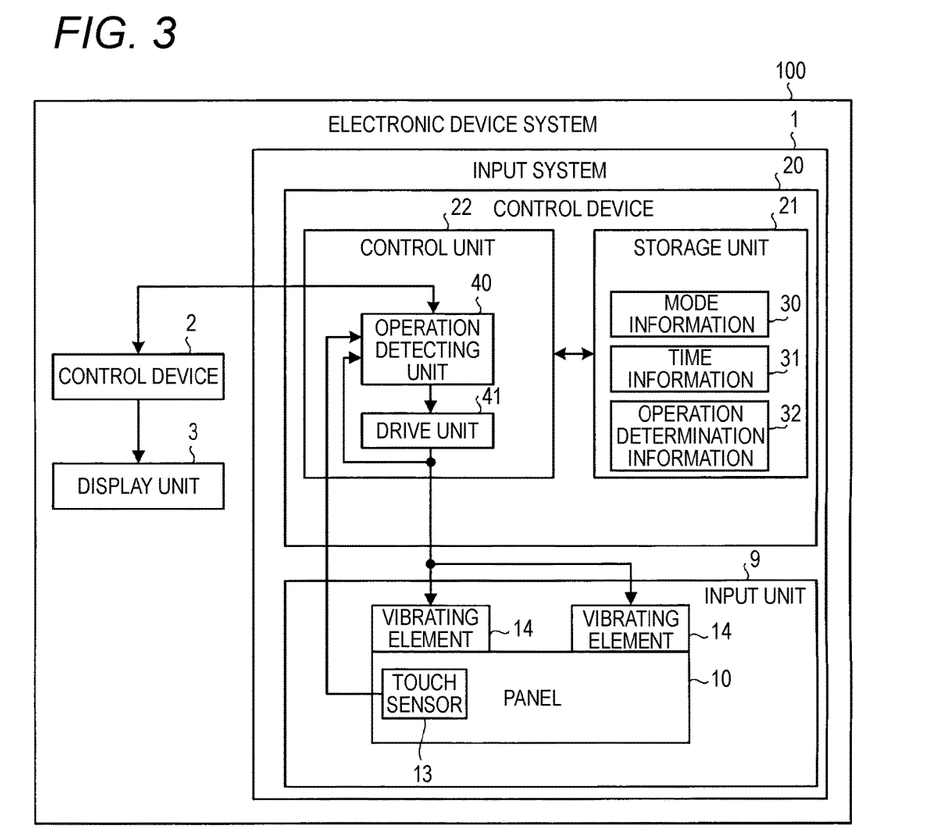
FIG. 3 is a view illustrating the configuration of an electronic device system having the input system according to the embodiment.

FIG. 3 is a view illustrating the configuration of an electronic device system 100 having the input system 1 according to the embodiment. The electronic device system 100 shown in FIG. 3 is, for example, an in-vehicle system mountable on a vehicle; however, it is not limited to the corresponding example, and may be other systems such as a computer system including a personal computer (PC).

As shown in FIG. 3, the electronic timepiece 1 includes the input system 1, a control device 2, and a display unit 3. The input system 1 receives user's operations, and notifies the control device 2 of information representing the user's operations. The control device 2 controls screens to be displayed on the display unit 3, in response to user's operations.

The input system 1 includes an input unit 9 and the control device 20. As described above, the input unit 9 includes the panel 10 and the plurality of vibrating elements 14. Also, the touch sensor 13 of the panel 10 is a sensor capable of detecting the positions of touches of the user U on the operation surface 15 of the panel 10, and is an electrostatic capacitance type touch panel as described above; however, it may be a touch sensor other than electrostatic capacitance type touch sensors. For example, in order to detect the pressures of touches of the user U on the operation surface 15 of the panel 10, a pressure-sensitive resistance type touch sensor can be used as the touch sensor 13.

The vibrating elements 14 are attached to the front surface or rear surface of the panel 10. The vibrating elements 14 are, for example, piezoelectric elements. However, in the case where the vibrating elements 14 do not need to detect the pressures of user's operations on the operation surface 15 of the panel 10 or in the case where the touch sensor 13 is a pressure sensor, the vibrating elements 14 may be linear resonance actuators or the like. Also, although not shown in the drawings, the input unit 9 may include an amplifier configured to amplify each drive voltage output from the control device 20 and output the amplified drive voltage to the vibrating elements 14.

Figure 4:
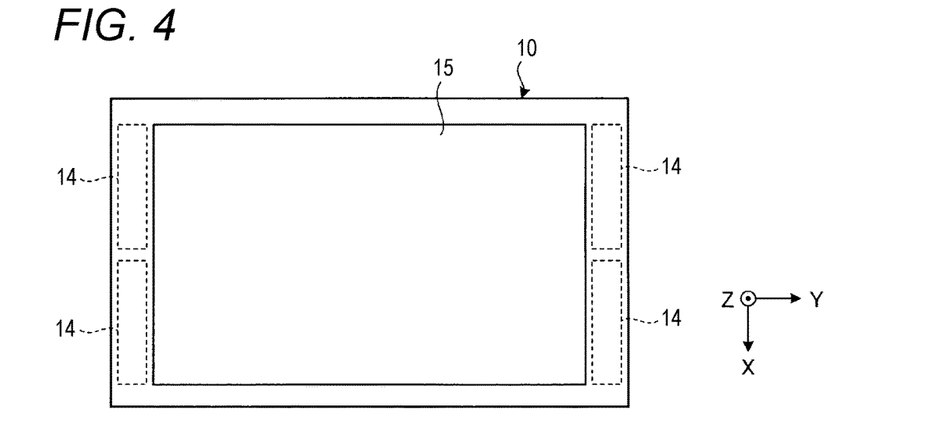
FIG. 4 is a view illustrating an arrangement example of vibrating elements according to the embodiment.

FIG. 4 is a view illustrating an arrangement example of the vibrating elements 14 according to the embodiment. In the example shown in FIG. 4, the input unit 9 has four vibrating elements 14. On each of both end portions of the panel 10, two of the four vibrating elements 14 are disposed. The number of vibrating elements 14 is not limited to four, and may be three or less, or may be five or more. For example, on each of both end portions of the panel 10, one vibrating element 14 may be disposed.

The control device 20 includes a storage unit 21 and a control unit 22. The storage unit 21 retains mode information 30, time information 31, and operation determination information 32. The mode information 30 is, for example, information representing a vibration mode type set through an input unit (not shown in FIG. 4), and as the vibration mode type, one of a fixed mode and a variable mode can be set.

The fixed mode is a mode for vibrating the panel 10 in a fixed vibration pattern in response to user's operations, and the variable mode is a mode for vibrating the panel 10 in vibration patterns depending on the states of user's operations.

The time information 31 is information defining production times of individual types of vibration, and includes information representing first and second times T1 and T2 to be described below. The operation determination information 32 is information for determining user's operations, and includes information representing first and second thresholds Pth1 and Pth2 for pressures of user's operations, information representing a threshold Dth for distances of slide operations, and so on.

The control device 2 includes the operation detecting unit 40 and the drive unit 41. The operation detecting unit 40 acquires detection information representing the positions of touches of the user U on the operation input unit 52 detected by the touch sensor 13, and acquires the value of an output voltage output from the vibrating elements 14 in a state where the vibrating elements are not driven by the drive unit 41. Also, on the basis of the value of the output voltage, the operation detecting unit 40 detects the pressures of touches of the user U on the operation surface 15. Further, the operation detecting unit 40 acquires the operation determination information 32 retained in the storage unit 21.

The operation detecting unit 40 detects user's operations on the basis of the detection information acquired from the touch sensor 13, touch pressures obtained from the voltage output from the vibrating element 14, and the operation determination information 32 acquired from the storage unit 21.

The operation detecting unit 40 can detect various user's operations such as pressing operations and slide operations of the user U on the operation surface 15. Also, in the case where the touch sensor 13 is a pressure sensor, the operation detecting unit 40 can acquire information representing the pressures of touches of the user U on the operation surface 15, from the touch sensor 13, without using the output voltage of the vibrating elements 14.

The operation detecting unit 40 can determine that there is a pressing operation of the user U on the operation surface 15 if the position of a touch of the user U on the operation surface 15 is kept at the same position and the touch pressure is equal to or larger than the first threshold Pth1.

Also, the operation detecting unit 40 can determine that there is a slide operation of the user U on the operation surface 15 if the position of a touch of the user U on the operation surface 15 moves by the threshold Dth or more in a state where the pressure of the touch of the user U on the operation surface 15 is equal to or larger than the second threshold Pth2. Alternatively, the operation detecting unit 40 may determine that there is a slide operation if the position of a touch moves by the threshold Dth or more, regardless of the pressure of the touch.

If the operation detecting unit 40 detects a slide operation, the drive unit 41 drives the vibrating elements 14, thereby vibrating the panel 10 in the first vibration mode and then vibrating the panel 10 in the second vibration mode different from the first vibration mode in at least some frequencies.

Figure 5:
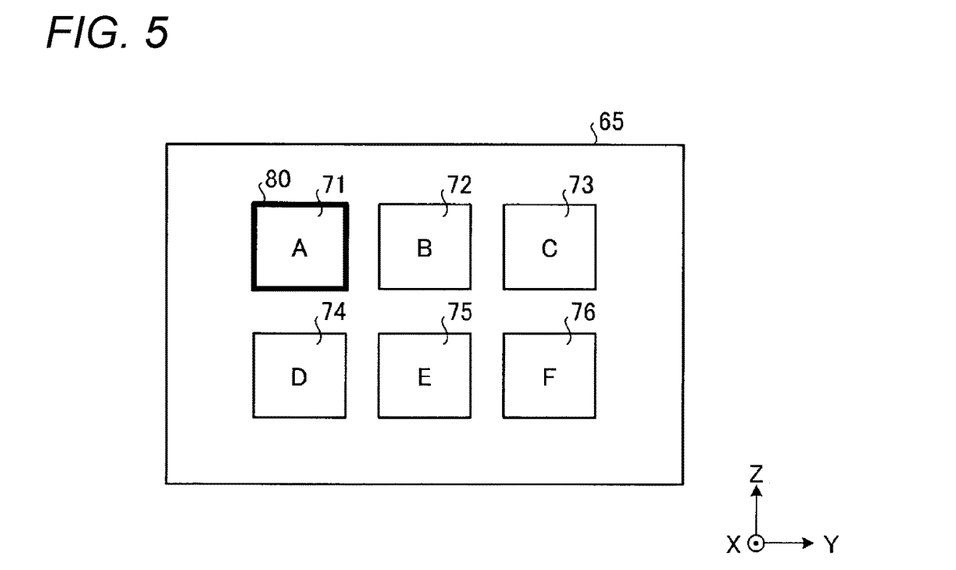
FIG. 5 is a view illustrating an example of a screen which can be displayed on a display device according to the embodiment.
Figure 6:
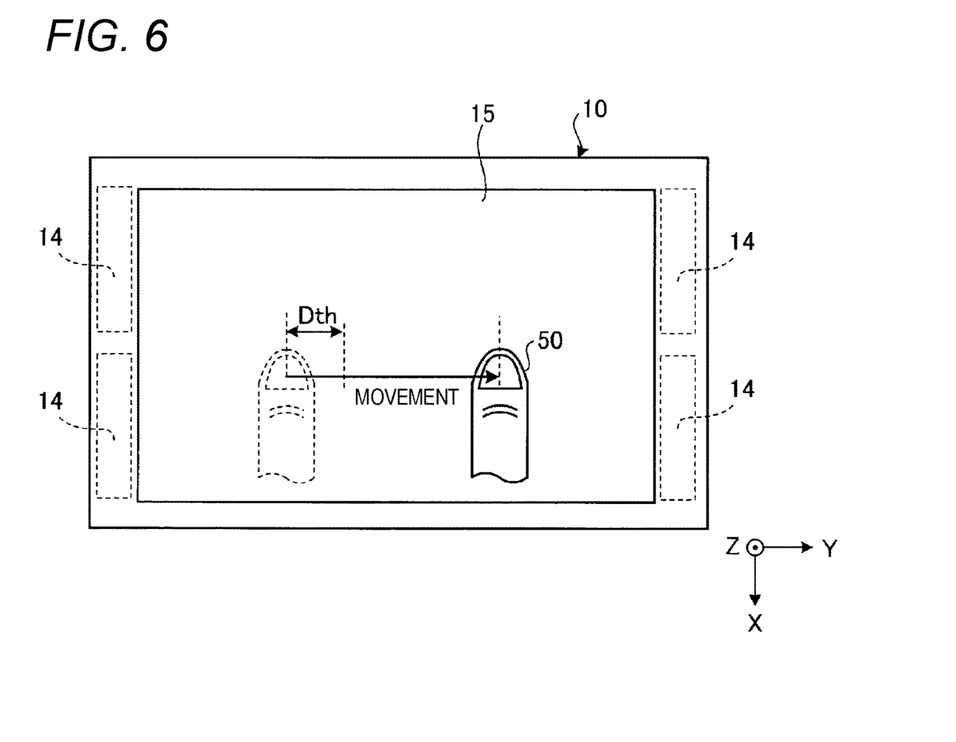
FIG. 6 is a view illustrating an example of an operation which a user can perform on the operation surface of a panel.

Hereinafter, an example of the case where the user U performs an operation on a menu screen displayed on the display unit 3 through the input system 1 will be described. FIG. 5 is a view illustrating an example of a screen which can be displayed on the display unit 3, and FIG. 6 is a view illustrating an example of an operation which the user U can perform on the operation surface 15 of the panel 10.

The screen shown in FIG. 5 is a menu screen 65, and includes six icons 71 to 76 (hereinafter, also referred to collectively as icons 70). The user U can temporarily select any one of the icons 71 to 76 by performing a slide operation on the operation surface 15, and then confirm the selection of the corresponding icon 70 by performing a pressing operation on the operation surface 15.

The state shown in FIG. 5 is a state where the icon 71 is highlighted by a highlighting frame 80 and the icon 71 has been temporarily selected. The highlighting frame 80 is used as a cursor; however, for example, an arrow image indicating an icon 70 may be used as a cursor. In this case, the position of the arrow image is set to a position corresponding to the icon 70 temporarily selected, such that the temporarily selected icon 70 becomes recognizable.

In the case where the user U wants to select the icon 72, for example, as shown in FIG. 5, if the user moves the position of touch on the operation surface 15 to a direction (here, the right side) corresponding to the direction from the icon 71 to the icon 72 by the threshold Dth or more, the operation detecting unit 40 of the control device 20 detects the slide operation of the user U to the right side. If detecting the slide operation to the right side, the operation detecting unit 40 of the control device 20 outputs information representing the slide operation to the right side to the control device 2.

If the control device 2 receives the information representing the slide operation to the right side from the control device 20 of the input system 1, it controls the display unit 3 such that the display unit displays a menu screen 66 including an animation image to show that the highlighting frame 80 moves from the icon 71 to the icon 72.

Meanwhile, if the slide operation to the right side continues and the amount of movement on the operation surface 15 exceeds the threshold Dth, the control device 20 of the input system 1 vibrates the panel 10 in the first vibration mode for the first time T1 with the animation images showing that the highlighting frame 80 moves. Thereafter, from the timing when movement of the highlighting frame 80 to the icon 72 is completed, the control device 20 vibrates the panel 10 in the second vibration mode for the second time T2.

Therefore, the user U can appropriately recognize the state where the temporarily selected icon 70 is transitioning from the icon 71 to the icon 72 and the state where temporary selection of the icon 72 has been completed, and it is possible to improve the operational feeling to be given to the user U. Hereinafter, the corresponding process will be described in more detail with reference to FIG. 7.

Figure 7:
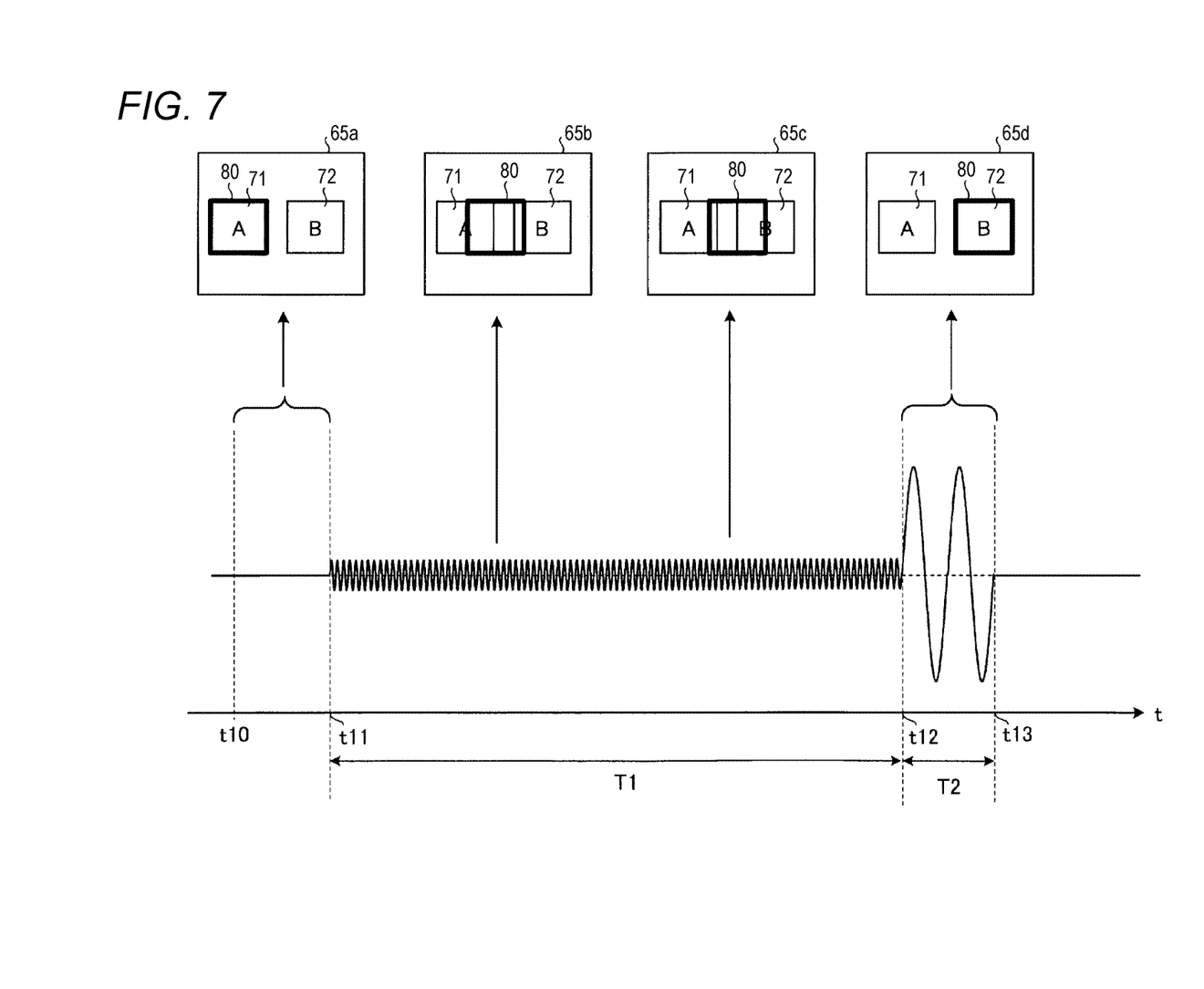
FIG. 7 is a view illustrating the relation between menu screens which are displayed when an icon temporarily selected is changed and different types of vibration which are given to the panel by the input system.

FIG. 7 is a view illustrating the relation between menu screens which are displayed when an icon 70 temporarily selected is changed and types of vibration which are given to the panel 10 by the input system 1. Also, in menu screens 65a to 65d shown in FIG. 7, for ease of explanation, only the icons 71 and 72 are shown.

At a time point t10 shown in FIG. 7, the user U touches the operation surface 15 of the panel 10. Then, if the user U moves the position of the touch on the operation surface 15 of the panel 10 to the right side, at a time point t11 when the amount of movement becomes the threshold Dth, the operation detecting unit 40 detects the slide operation of the user U, and outputs information representing the slide operation to the right side, to the control device 2.

If the operation detecting unit 40 detects the slide operation of the user U, the drive unit 41 outputs a drive voltage Vo1 for the first vibration mode to the individual vibrating elements 14 for the first time T1 (for example, 50 ms) from the time point t11 to a time point t12, on the basis of the time information 31 retained in the storage unit 21. The drive voltage Vo1 is a sinusoidal voltage having a frequency (for example, 30 kHz) in the ultrasonic frequency band, and if the drive voltage Vo1 is applied to the individual vibrating elements 14, the vibrating elements 14 vibrate at the frequency in the ultrasonic frequency band, resulting in ultrasonic vibration of the panel 10.

Ultrasonic vibration of the panel 10 produces a squeeze effect capable of reducing the frictional force of the operation input unit 52 acting on the user U. The squeeze effect refers to a phenomenon in which if the vibrating elements 14 cause ultrasonic vibration of the operation surface 15 and the vibration causes change in the pressure, air is drawn into the gap between the finger 50 of the user U and the operation surface 15 and an air space is formed, whereby the friction resistance between the finger 50 of the user U and the operation surface 15 becomes relatively lower than that in the case where there is no vibration.

As described above, in the first vibration mode, it is possible to reduce the frictional force of the operation surface 15 acting on the finger 50 of the user U. Therefore, it is possible to change the frictional force of the operation surface 15, depending on movement in the period from when the slide operation of the user U starts to when the amount of movement becomes the threshold Dth, and movement after the amount of movement becomes the threshold Dth, such that the user U can recognize that the input system is receiving the slide operation, by his feeling.

Also, since the frictional force of the operation surface 15 decreases, it is possible to give the user U moving the finger 50 on the operation surface 15 a feeling of being sucked in the slide direction of the slide operation, and thereby it is possible to improve the operational feeling to be given to the user U.

As shown in FIG. 7, in a state where the panel 10 is vibrating in the first vibration mode, the control device 2 generates a plurality of menu screens including the menu screens 65a to 65d to show that the highlighting frame 80 sequentially moves from the icon 71 to the icon 72, and controls the display unit 3 such that the display unit displays the plurality of generated menu screens. In the example shown in FIG. 7, the menu screens 65a to 65d showing that highlighting frame 80 moves in three stages are shown; however, the control device 2 can generate a plurality of menu screens to show that the highlighting frame 80 moves in four or more stages. Also, in menu screens 65a to 65d shown in FIG. 7, for ease of explanation, only the icons 71 and 72 are shown.

As described above, in the state where the panel 10 is vibrating in the first vibration mode, the display unit 3 displays the plurality of menu screens to show that the highlighting frame 80 sequentially moves from the icon 71 to the icon 72. Therefore, the user U can realize that the input system 1 is receiving the slide operation, not only by a sense of touch but also by a sense of sight. If the sense of touch and the sense of sight are used together, it is possible to give the user U a more strong feeling of being sucked which is a feeling that the highlighting frame 80 is sucked from the icon 71 to the icon 72, and it is possible to further improve the operational feeling to be given to the user U.

On the basis of the time information 31 retained in the storage unit 21, for the second time T2 from the time point t12 when vibration of the panel 10 in the first vibration mode is completed (from the time point t12 to a time point t13), the drive unit 41 outputs a drive voltage Vo2 for the second vibration mode to the individual vibrating elements 14.

The drive voltage Vo2 is a sinusoidal voltage having a frequency (for example, 200 Hz) in a low-frequency band, and the amplitude of the drive voltage Vo2 is larger than the amplitude of the drive voltage Vo1. In the example shown in FIG. 7, the drive voltage Vo2 is a sinusoidal voltage having two periods or three periods at most, and in the case where the drive voltage Vo2 is 200 Hz, the second time T2 is 10 ms. If the drive voltage Vo2 is applied to the individual vibrating elements 14, the vibrating elements 14 vibrates at the frequency in the low-frequency band, resulting in low-frequency vibration of the panel 10. However, the drive voltage Vo2 is not limited to a sinusoidal voltage having two periods or three periods at most.

In the second vibration mode, since the vibration frequency of the panel 10 is a low frequency, and the panel vibrates for a short time, it is possible to give a click feeling to the user U. Also, since the drive voltage Vo2 for the second vibration mode is larger than the drive voltage Vo1 for the first vibration mode, it is possible to accurately give a feeling to the user U by vibration.

Further, in the second vibration mode, since the ultrasonic vibration of the panel 10 stops and the frictional force increases, it is possible to effectively inform the user U that sliding of the highlighting frame 80 has finished. Also, since the vibration frequency of the panel 10 is a low frequency and the second time T2 is a short time, for example, in the second vibration mode, it is also possible to suppress sound generated by vibration of the panel 10 such that the sound is inaudible to the user U.

Also, the control device 20 controls the display unit 3 such that the display unit displays the menu screen 65d at the time point t12 when vibration of the panel 10 in the first vibration mode is completed. Therefore, the user U can realize that the input system has received the temporary selection of the icon 70, not only the sense of touch but also by the sense of sight, and it is possible to further improve the operational feeling to be given to the user U.

Meanwhile, in the case where the operation detecting unit 40 detects that the slide operation or the touch of the user U on the operation surface 15 has finished within the first time T1, the drive unit 41 may not perform the second vibration mode. In this case, it is possible to reduce the processing load on the drive unit 41.

Also, if the operation detecting unit 40 detects a touch of the user U on the operation surface 15, in order to reduce the frictional force of the operation surface 15 until the operation detecting unit 40 detects a slide operation, the drive unit 41 may apply a sinusoidal voltage having a frequency (for example, 30 Hz) in the ultrasonic frequency band as a drive voltage Vo3 to the individual vibrating elements 14. Thereafter, if the operation detecting unit 40 detects a slide operation of the user U, the drive unit 41 may apply the drive voltage Vo1 higher than the drive voltage Vo3 (for example, a voltage which is 1.5 times the drive voltage Vo3, or higher) to the individual vibrating elements 14, thereby capable of improving the slippery feeling in the first vibration mode and improving the feeling of being sucked.

In the above-described example, in the second vibration mode, vibration in the low-frequency band is given to the panel 10. However, in the second vibration mode, the drive unit 41 may give vibration which is a combination of vibration in the ultrasonic frequency band and vibration in the low-frequency band to the panel 10.

In this case, the drive unit 41 generates a drive voltage Vo2' by superimposing a signal having a frequency in the ultrasonic frequency band on a signal having a frequency (for example, 200 Hz) in the low-frequency band. The drive unit applies the drive voltage Vo2' to the individual vibrating elements 14, thereby capable of giving vibration which is a combination of vibration in the low-frequency band and vibration in the ultrasonic vibration to the panel 10. Further, the control device 2 changes the color or the like of the icon 72 of the menu screen 65d of the display unit 3 at the time point t13 when vibration of the panel 10 in the second vibration mode is completed, such that the user can see that the icon 72 has been selected. Alternatively, the control device 2 performs a function related to the icon 72.

As described above, vibration which is a combination of vibration in the ultrasonic frequency band and vibration in the low-frequency band is given to the panel 10, whereby it is possible to give the click feeling while continuously giving the feeling of being sucked to the user U.

In the above-described example, in the second vibration mode, the panel 10 is vibrated at a frequency in the low-frequency band. However, in the second vibration mode, it is needed only to vibrate the panel 10 at a frequency lower than the ultrasonic frequency band, and vibration in the second vibration mode is not limited to vibration at a frequency in the low-frequency band.

For example, in the second vibration mode, the drive unit 41 may vibrate the panel 10 in a high-frequency band lower than the ultrasonic frequency band and higher than the low-frequency band. In this specification, a frequency band lower than 300 Hz is used as the low-frequency band, and a frequency band equal to or higher than 300 Hz and lower than 20 kHz is used as the high-frequency band. However, the low-frequency band and the high-frequency band are not limited to those examples. For example, the low-frequency band may be a frequency band equal to or lower than 200 Hz.

Also, in the above-described example, in the first vibration mode, the drive unit 41 causes ultrasonic vibration of the panel 10. However, the present invention is not limited to the example. The drive unit 41 may generate a drive voltage Vo1 having a frequency in the low-frequency band or the high-frequency band and apply the generated drive voltage to the individual vibrating elements 14, thereby vibrating the panel 10 at a high frequency. Also, the drive unit 41 may change the frequency for the first vibration mode and the frequency for the second vibration mode, depending on the types of user's operations.

As described above, if the operation detecting unit 40 detects a user's operation, the control device 20 according to the embodiment drives the vibrating elements 14 while switching between the first vibration mode and the second vibration mode different in at least some vibration frequencies, thereby sequentially giving different types of vibration to the panel 10. In this way, in the case where the user U operates the operation surface 15 of the panel 10, it is possible to give a plurality of different feelings to the user U by different types of vibration depending on user's operations, and it is possible to improve the operational feeling to be given to the user U.

Figure 8:
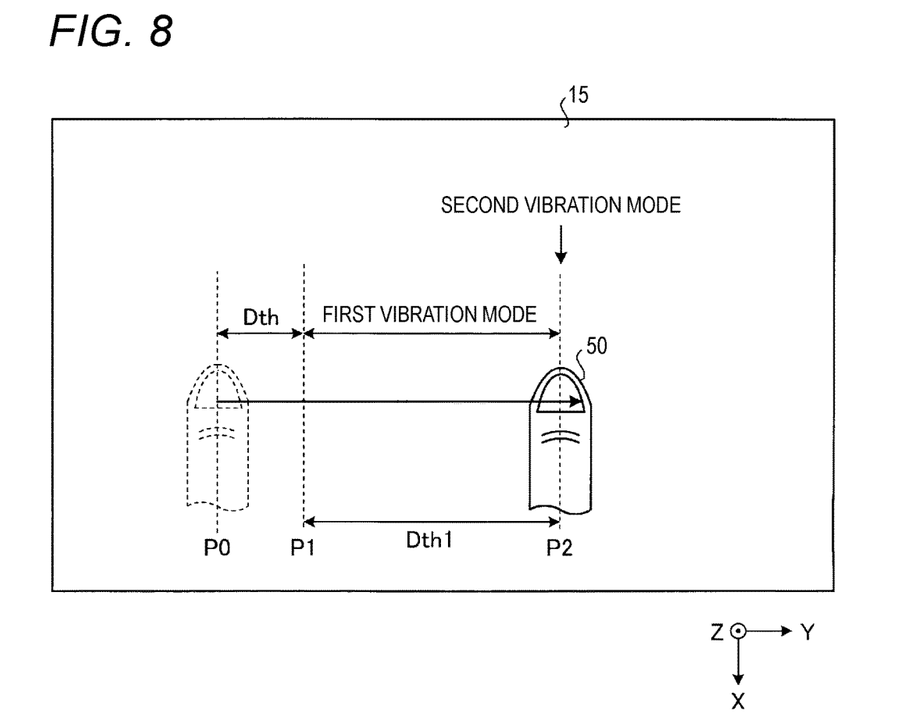
FIG. 8 is a view for explaining control which a drive unit according to the present embodiment performs on the panel in a variable mode.

Control of the drive unit 41 on the panel 10 described above is control in the fixed mode in which times for the individual vibration modes are fixed. However, in the case where the vibration mode is the variable mode, the drive unit 41 may change times for the individual vibration modes, depending on the states of user's operations. FIG. 8 is a view for explaining control which the drive unit 41 performs on the panel 10 in the variable mode.

As shown in FIG. 8, in the case where the user U touches a position P0 on the operation surface 15 of the panel 10 and then performs a slide operation to the right side, similarly in the fixed mode, if the user U moves the touch position to the right side by the threshold Dth or more, the operation detecting unit 40 detects the slide operation of the user U to the right side, and notifies the control device 2 of first information representing the slide operation to the right side. Further, the operation detecting unit 40 notifies the control device 2 of second information including the position or movement amount of the touch of the user U on the operation surface 15 after detecting the slide operation.

If the control device 2 receives the first and second information from the control device 20 of the input system 1, it controls the display unit 3 such that the display unit displays the menu screens 65a to 65d (see FIG. 7) including the animation images to show that the highlighting frame 80 moves from the icon 71 to the icon 72.

Specifically, the control device 2 generates the menu screens 65a to 65d including the animation images to change at a speed depending on the position or movement amount of the touch of the user U on the operation surface 15 after detection of the slide operation. Therefore, the control device can control the display unit 3 such that the display unit displays the menu screens 65a to 65d including the animation images showing that the highlighting frame 80 moves from the icon 71 to the icon 72 at the speed of the slide operation of the user U.

If the slide operation to the right side continues after the amount of movement reaches the threshold Dth, the drive unit 41 vibrates the panel 10 in the first vibration mode in sync with the animation images showing that the highlighting frame 80 moves. Further, on the basis of the position or movement amount of the touch detected by the operation detecting unit 40, the drive unit 41 vibrates the panel 10 in the first vibration mode until the movement amount of the slide operation becomes equal to or larger than a threshold Dth1 (a distance from a position P1 to a position P2 shown in FIG. 8). The threshold Dth1 is a threshold for the movement amount of the slide operation necessary to move the highlighting frame 80 from the icon 71 to the icon 72, and is retained in the storage unit 21.

In the case where the movement amount of the slide operation is equal to or larger than the threshold Dth1, the drive unit 41 vibrates the panel 10 in the second vibration mode. Also, in the case where the movement amount of the slide operation is equal to or larger than the threshold Dth1, the control device 2 controls the display unit 3 such that the display unit displays the menu screen 65d.

As described above, until the movement amount of the slide operation reaches the threshold Dth1, since the control device 20 keeps the first vibration mode, it is possible to give a feeling depending on the speed of the slide operation of the user U to the user U. Therefore, it is possible to further improve the operational feeling to be given to the user U. Also, the type of vibration in the first vibration mode and the type of vibration in the second vibration mode when the variable mode is performed are the same as those in the fixed mode.

The fixed mode and the variable mode can be set, for example, in the storage unit 21 of the control device 20 through an input unit (not shown in FIG. 8), and on the basis of the information stored in the storage unit 21, the drive unit 41 can selectively perform one of the fixed mode and the variable mode.

Also, the control device 20 may selectively perform one of the fixed mode and the variable mode in response to a request from the control device 2. As a result, it is possible to switch between the fixed mode and the variable mode, for example, depending on a screen to be displayed on the display unit 3.

Also, in response to a slide operation of moving the finger 50 on the operation surface 15 of the panel 10 such that the finger draws a circle, the drive unit 41 may perform the first vibration mode until the finger turns by a certain angle, and perform the second vibration mode if the finger turns by the certain angle. Since turning by the certain angle occurs at regular angular intervals, the user U can obtain a feeling that he is operating the dial of a safe or the like. Therefore, it is possible to improve the operational feeling to be given to the user U.

Also, the drive unit 41 may perform the first vibration mode while a slide operation is performed, and perform the second vibration mode if the user U performs a pressing operation on the operation surface 15 without removing the finger from the operation surface 15 of the panel 10 after the slide operation. Even in this case, it is possible to give a feeling of being sucked and a click feeling to the user U. Therefore, it is possible to improve the operational feeling to be given to the user U.

Also, in the case where the user U touches an arbitrary position on the operation surface 15 and keeps the touch at the same position on the operation surface 15 for a set time or more, the drive unit 41 may perform the first vibration mode for the first time T1 and then perform the second vibration mode for the second time T2. As described above, in response to user's operations, the drive unit 41 drives the vibrating elements 14 while switching between the first vibration mode and the second vibration mode. Therefore, it is possible to improve the operational feeling to be given to the user U.

Figure 9:
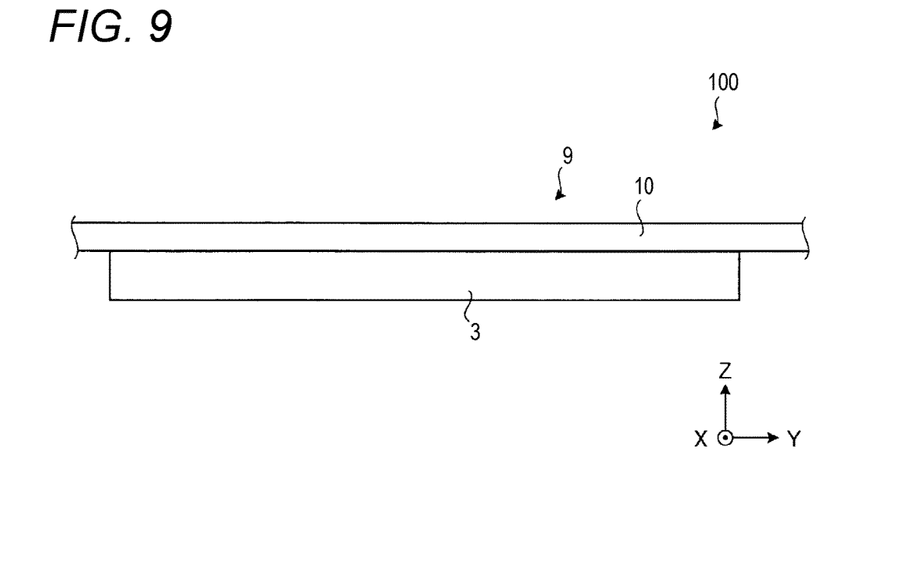
FIG. 9 is a view illustrating the relation between an input unit and the display device in an electronic device system according to the embodiment.

The electronic device system 100 may have a configuration including a touch panel display obtained by integrating the input unit 9 and the display unit 3, as shown in FIG. 9. FIG. 9 is a view illustrating the relation between the input unit 9 and the display unit 3 in the electronic device system 100. As shown in FIG. 9, the display unit 3 is disposed on the rear surface of the panel 10, such that if the display unit 3 displays screens, the user U can see them through the panel 10.

Also, although the control device 2 and the control device 20 in the example shown in FIG. 3 are separate components, the function of the control device 2 may be added to the control device 20. In this case, the control device 2 is connected to the input unit 9 and is connected to the display unit 3 such that the control device can control the display unit 3 such that the display unit displays screens depending on operations on the input unit 9.

<3. Process which Control Device 20 Performs on Input System 1>

Figure 10:
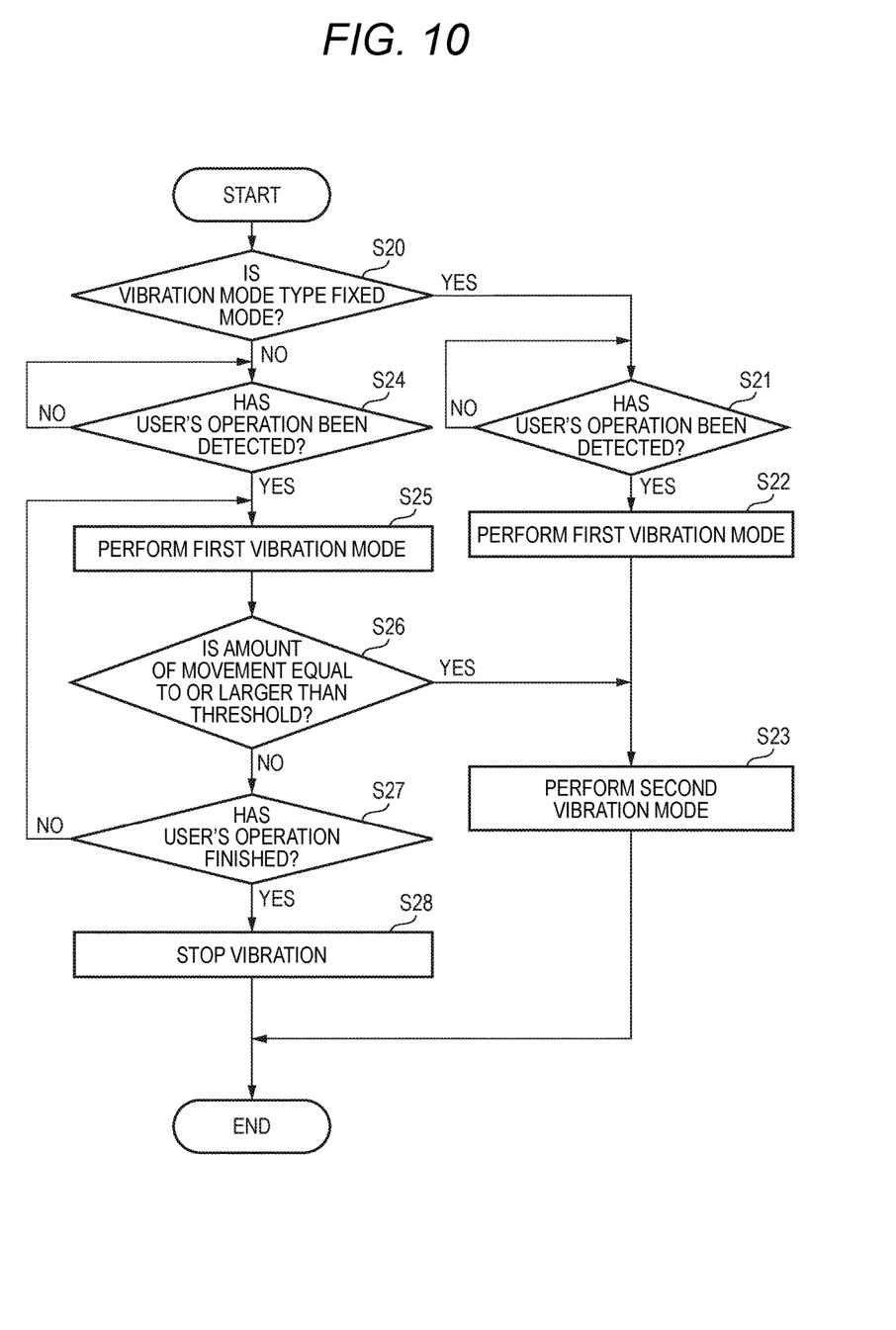
FIG. 10 is a flow chart illustrating an example of the procedure of a process which is performed by a control unit of the control device according to the embodiment.

Now, with reference to a flow chart, an example of the flow of a process which is performed by the control unit 22 of the control device 20 will be described. FIG. 10 is a flow chart illustrating an example of the procedure of the process which is repeatedly performed by the control unit 22.

As shown in FIG. 10, in STEP S20, the control unit 22 determines whether the vibration mode type set in the storage unit 21 is the fixed mode. In the case where the vibration mode type is the fixed mode ("Yes" in STEP S20), in STEP S21, the control unit 22 determines whether a user's operation has been detected. In the case where it is determined that any user's operation has not been detected ("No" in STEP S21), the control unit 22 repeats the process of STEP S21.

In the case where it is determined that a user's operation has been detected ("Yes" in STEP S21), in STEP S22, the control unit 22 applies the drive voltage Vo1 to the vibrating elements 14, thereby vibrating the panel 10 in the first vibration mode for the first time T1. Thereafter, in STEP S23, the control unit 22 applies the drive voltage Vo2 to the vibrating elements 14 for the second time T2, thereby vibrating the panel 10 in the second vibration mode for the second time T2.

Meanwhile, in the case where it is determined in STEP S20 that the vibration mode type is the variable mode ("No" in STEP S20), in STEP S24, the control unit 22 determines whether a user's operation has been detected. In the case where it is determined that a user's operation has been detected ("Yes" in STEP S24), in STEP S25, the control unit 22 applies the drive voltage Vo1 to the vibrating elements 14, thereby vibrating the panel 10 for the first time T1. Meanwhile, in the case where it is determined that any user's operation has not been detected ("No" in STEP S24), the control unit 22 repeats the process of STEP S24.

After the process of STEP S25 finishes, in STEP S26, the control unit 22 determines whether the movement amount of the user's operation is equal to or larger than the threshold Dth1, or not. In the case where it is determined that the movement amount of the user's operation is smaller than the threshold Dth1 ("No" in STEP S26), in STEP S27, the control unit 22 determines whether the user's operation has finished.

In the case where it is determined in STEP S27 that the user's operation has finished ("Yes" in STEP S27), in STEP S28, the control unit 22 stops applying the drive voltage to the vibrating elements 14, thereby stopping vibration of the panel 10. Meanwhile, in the case where it is determined in STEP S27 that the user's operation has not finished ("No" in STEP S270, the control unit 22 returns the process to STEP S25.

In the case where it is determined in STEP S26 that the movement amount of the user's operation is equal to or larger than the threshold Dth1 ("Yes" in STEP S26), the control device 2 performs the process of STEP S23 described above. If the process of STEP S23 or the process of STEP S28 finishes, the control unit 22 repeatedly performs the process from STEP S20.

Figure 11:
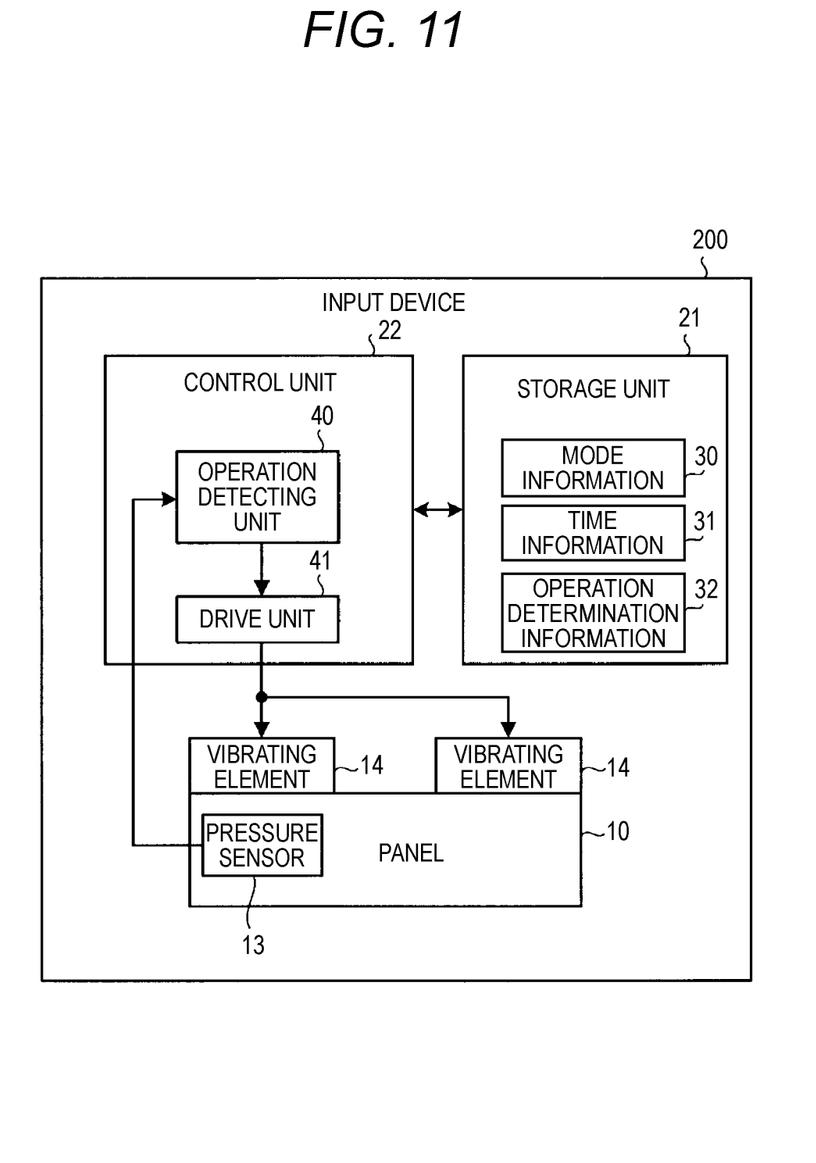
FIG. 11 is a view illustrating an example of the configuration of an input device according to the embodiment.

In the above-described embodiment, the input unit 9 and the control device 20 are separate. However, the input system 1 may be an input device configured by integrating the input unit 9 and the control device 20. FIG. 11 is a view illustrating an example of the configuration of an input device 200 according to the embodiment.

The input device 200 shown in FIG. 11 is configured to include the panel 10, the vibrating elements 14, the storage unit 21, and the control unit 22 by integrating the input unit 9 and the control device 20 shown in FIG. 3. Like this, an input device may be configured by integrating the input unit 9 and the control device 20. Also, the control device 20 and the control device 2 may be integrated, and the input system 1, the control device 2, and the display unit 3 may be integrated.

As described above, the control device 20 according to the embodiment includes the operation detecting unit 40 for detecting user's operations on the operation surface 15 of the panel 10, and the drive unit 41 for driving the vibrating elements 14 attached to the panel 10, thereby vibrating the panel 10. If the operation detecting unit 40 detects a user's operation, the drive unit 41 drives the vibrating elements 14 while switching between the first vibration mode and the second vibration mode different in at least some vibration frequencies, thereby subsequently giving different types of vibration different in at least some frequencies to the panel 10. Therefore, it is possible to give a plurality of different feelings to the user U by different types of vibration, and it is possible to improve the operational feeling to be given to the user U.

Also, the first vibration mode is a mode for vibrating the panel 10 in a frequency in the ultrasonic frequency band, and the second vibration mode is a mode for vibrating the panel in a frequency band lower than the ultrasonic frequency band. If the operation detecting unit 40 detects a user's operation, the drive unit 41 drives the vibrating elements 14 in the first vibration mode, and then drives the vibrating elements 14 in the second vibration mode. In this way, it is possible to sequentially give a feeling of being sucked and a click feeling to the user U Also, the first vibration mode is a mode for vibrating the panel 10 at a frequency in the ultrasonic frequency band, and the second vibration mode is a mode for giving vibration which is a combination of vibration at a frequency in the ultrasonic frequency band and vibration in a frequency band lower than the ultrasonic frequency band to the panel. If the operation detecting unit 40 detects a user's operation, the drive unit 41 drives the vibrating elements 14 in the first vibration mode, and then drives the vibrating elements 14 in the second vibration mode. In this way, it is possible to give a feeling of being sucked and a click feeling to the user U Also, in the case where a user's operation detected by the operation detecting unit 40 is a slide operation, the drive unit 41 drives the vibrating elements 14 in the first vibration mode for a predetermined time (the first time T1), and then drives the vibrating elements 14 in the second vibration mode. Since the first vibration mode and the second vibration mode are switched at a predetermined timing as described above, for example, it is possible to perform switching between the vibration modes without detecting the movement amount of the user's operation, and it is possible to reduce the processing load on the drive unit 41.

Also, in the case where a user's operation detected by the operation detecting unit 40 is a slide operation, the drive unit 41 drives the vibrating elements 14 in the first vibration mode. Then, if the movement amount of the slide operation is equal to or larger than the threshold Dth1, the drive unit drives the vibrating elements 14 in the second vibration mode. In this way, it is possible to give a feeling according to the speed of the slide operation of the user U to the user U. Therefore, it is possible to further improve the operational feeling to be given to the user U.

Also, the drive unit 41 sets the amplitude of the drive voltage Vo2 to be applied to the vibrating elements 14 in the second vibration mode larger than the amplitude of the drive voltage Vo1 to be applied to the vibrating elements 14 in the first vibration mode. In this way, it is possible to make vibration in the second vibration mode larger than vibration in the first vibration mode, and it is possible to give different feelings to the user U not only by the difference between the vibration frequencies but also by the difference between the vibration amplitudes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control device comprising:
a computer configured to:
detect an operation of a user on an operation surface of a panel; and
drive a vibrating element attached to the panel, thereby vibrating the panel, such that if the operation is detected, the vibrating element is driven while switching between a first vibration mode and a second mode that are different in at least some vibration frequencies, thereby sequentially providing different types of vibration, different in at least some frequencies, to the panel,
wherein the first vibration mode is a mode of vibrating the panel at a frequency in an ultrasonic frequency band, and
the second vibration mode is a mode of providing vibration which is a composite vibration of vibration at the frequency in the ultrasonic frequency band and vibration in a frequency band lower than the ultrasonic frequency band.

2. The control device according to claim 1, wherein if the operation is detected, the vibrating element is driven in the first vibration mode, and then the vibrating element is driven in the second vibration mode.

3. The control device according to claim 1, wherein in a case where the operation detected is a slide operation, the vibrating element is driven in the first vibration mode for a predetermined time, and then the vibrating element is driven in the second vibration mode.

4. The control device according to claim 3, wherein in a case where a movement amount of the slide operation is equal to or larger than a threshold, the vibrating element is driven in the second vibration mode.

5. The control device according to claim 1, wherein an amplitude of a drive voltage to be applied to the vibrating element in the second vibration mode is set larger than the amplitude of the drive voltage to be applied to the vibrating element in the first vibration mode.

6. An input system comprising:
a panel having an operation surface;
a vibrating element configured to vibrate the panel; and
a computer configured to:
detect an operation of a user on the operation surface; and
drive the vibrating element while switching between a first vibration mode and a second vibration mode that are different in at least some vibration frequencies, thereby sequentially providing different types of vibration, different in at least some frequencies to the panel,
wherein the first vibration mode is a mode of vibrating the panel at a frequency in an ultrasonic frequency band, and
the second vibration mode is a mode of providing vibration, which is a composite vibration of vibration at the frequency in the ultrasonic frequency band and vibration in a frequency band lower than the ultrasonic frequency band, to the panel.

7. A control method comprising:
detecting an operation of a user on an operation surface of a panel; and
driving a vibrating element attached to the panel while switching between a first vibration mode and a second vibration mode that are different in at least some vibration frequencies, thereby sequentially providing different types of vibration different in at least some frequencies to the panel, if the operation of the user on the operation surface is detected,
wherein the first vibration mode is a mode of vibrating the panel at a frequency in an ultrasonic frequency band, and
the second vibration mode is a mode of providing vibration, which is a composite vibration of vibration at the frequency in the ultrasonic frequency band and vibration in a frequency band lower than the ultrasonic frequency band, to the panel.

8. The control device according to claim 1, wherein a time period for which the vibrating element is driven in the second vibration mode is shorter than a period for which the vibrating element is driven in the first vibration mode.

* * * * *